(12) United States Patent
Jahr et al.

(10) Patent No.: US 6,196,795 B1
(45) Date of Patent: Mar. 6, 2001

(54) TURBINE PACK AND METHOD FOR ADAPTING A TURBINE PACK

(75) Inventors: Knuth Jahr, Vinterbro; Tom-Erik Frey, Nordkisa, both of (NO)

(73) Assignee: Kværner Energy a.s., Oslo (NO)

( * ) Notice: Subject to any disclaimer, the term of this patent is extended or adjusted under 35 U.S.C. 154(b) by 0 days.

(21) Appl. No.: 09/125,268
(22) PCT Filed: Nov. 22, 1996
(86) PCT No.: PCT/NO96/00278
§ 371 Date: Aug. 12, 1998
§ 102(e) Date: Aug. 12, 1998
(87) PCT Pub. No.: WO97/30276
PCT Pub. Date: Aug. 21, 1997

(30) Foreign Application Priority Data

Feb. 13, 1996 (NO) .................................................. 960571

(51) Int. Cl.⁷ ............................. F01D 25/26; F16M 13/00
(52) U.S. Cl. ........................................ 415/213.1; 248/554
(58) Field of Search ............................... 416/213.1, 126, 416/220, 222, 219.1; 248/554, 555, 556, 557

(56) References Cited

U.S. PATENT DOCUMENTS

| | | | |
|---|---|---|---|
| 2,195,230 | * 3/1940 | Warren .............................. 415/126 X |
| 2,747,367 | * 5/1956 | Savin, Jr. ....................... 415/199.5 X |
| 2,891,743 | * 6/1959 | Bligard et al. ....................... 248/557 |
| 2,947,140 | * 8/1960 | Norton ............................... 248/554 X |
| 2,949,268 | * 8/1960 | Eggers et al. ......................... 248/555 |
| 3,269,677 | * 8/1966 | Stoeckly ................................. 248/554 |
| 3,288,404 | * 11/1966 | Schmidt et al. ....................... 248/557 |
| 3,366,365 | * 1/1968 | Rizk ...................................... 415/138 |
| 3,556,672 | * 1/1971 | Gentile ................................ 415/134 |
| 3,620,641 | * 11/1971 | Keen .................................... 415/229 |
| 3,837,164 | * 9/1974 | Carr ............................... 415/208.1 X |
| 3,860,359 | * 1/1975 | De Feo ............................. 415/208.2 |
| 3,907,220 | * 9/1975 | Amelio ............................. 248/557 X |
| 4,002,023 | 1/1977 | Hartmann . |
| 4,050,660 | * 9/1977 | Eggmann et al. ............. 415/213.1 X |
| 4,204,804 | * 5/1980 | Woodger ............................ 415/213.1 |
| 4,487,014 | * 12/1984 | Vinciguerra ......................... 415/220 |
| 4,516,908 | 5/1985 | Vinciguerra . |
| 4,790,137 | * 12/1988 | Quinn .................................. 415/134 |
| 5,180,282 | * 1/1993 | Lenhart et al. .................... 415/209.2 |
| 5,211,541 | * 5/1993 | Fledderjohn et al. ......... 415/216.1 X |
| 5,427,348 | * 6/1995 | Bacon et al. .......................... 248/555 |
| 5,509,782 | * 4/1996 | Streeter .............................. 415/213.1 |

\* cited by examiner

*Primary Examiner*—John E. Ryznic
(74) *Attorney, Agent, or Firm*—Young & Thompson

(57) ABSTRACT

A device and method for adapting a turbine package, including a turbine and a frame (R), where the turbine includes an inlet bell mouth (1, 4, 8) and/or an exhaust bell mouth, and where there is a difference in length between two or more dissimilar models of turbines, so that the anchorage points (12, 13) of the bell mouth door (2, 5) or the plenum wall for the turbines do not correspond. The adaptation may, for example, be carried out either by extending the inlet bell mouth (8) of the shorter turbine, so that the anchorage points (12, 13) of the bell mouth doors (5, 10) of the two turbines correspond and by producing the frame sot hat the bell mouth door (10) is positioned in accordance with the corresponding anchorage points (12, 13), or by providing the bell mouth door with a conical section (24) having a length corresponding to the length difference between the turbines.

8 Claims, 6 Drawing Sheets

TURBINE PACK AND METHOD FOR ADAPTING A TURBINE PACK

BACKGROUND OF THE INVENTION

The invention relates to a turbine package, and to a method for adapting a turbine package.

A widely used gas turbine, having the designation LM 2500, from General Electric, is produced in two models, the standard version LM 2500 PE (PE) and a new, upgraded model having the designation LM 2500 Plus (Plus).

The Plus version is upgraded from an output of 22 MW for the PE version to 29 MW. The main change made during the upgrading consists in introducing a zero step in the compressor, so that the flow volume through the turbine is increased by 23%. The new step increases the length of the turbine by 13.38" (34 cm). This increase in length results in making the PE and the Plus turbine non-interchangeable, in particular because the bell mouth door of the PE turbine package would collide with the support bracket anchorage points of the Plus turbine if a Plus turbine were placed in a PE turbine package. It is not possible to change the anchorage points of the turbine, since these are carefully determined with respect to the natural frequency of the turbine, thermal influences, the distribution of forces and the flow characteristics at the inlet.

Accordingly, in case of a future upgrading by means of a change from a PE turbine to a Plus turbine, this increased length will involve substantial reconstruction of the turbine package (which comprises turbine, frame and supporting means for the turbine). The reconstruction will be costly and will entail a lengthy standstill before the new turbine can be put into service. Moving the inlet bell mouth door is particularly problematic. The mountings for the turbine on the frame cannot be used either, and it is therefore, in general, just as simple to exchange the whole frame, a process which obviously is very expensive. Moreover, this will make it impossible to change back to a PE turbine later, for example as a reserve turbine when the Plus turbine is undergoing repairs, etc.

SUMMARY OF THE INVENTION

The object of the present invention is to solve this problem in a manner which makes it possible to use the same frame for both the PE turbine and the Plus turbine.

In addition, possibilities have been explored for using at least some of the same anchorage points on the frame for support brackets and stays for the two turbine types. This is made possible in that the brackets and stays are interchangeable with brackets and stays adapted to each turbine type.

BRIEF DESCRIPTION OF THE DRAWINGS

The invention will now be further explained with reference to the enclosed drawings wherein.

DESCRIPTION OF THE PREFERRED EMBODIMENTS

Figure 1:
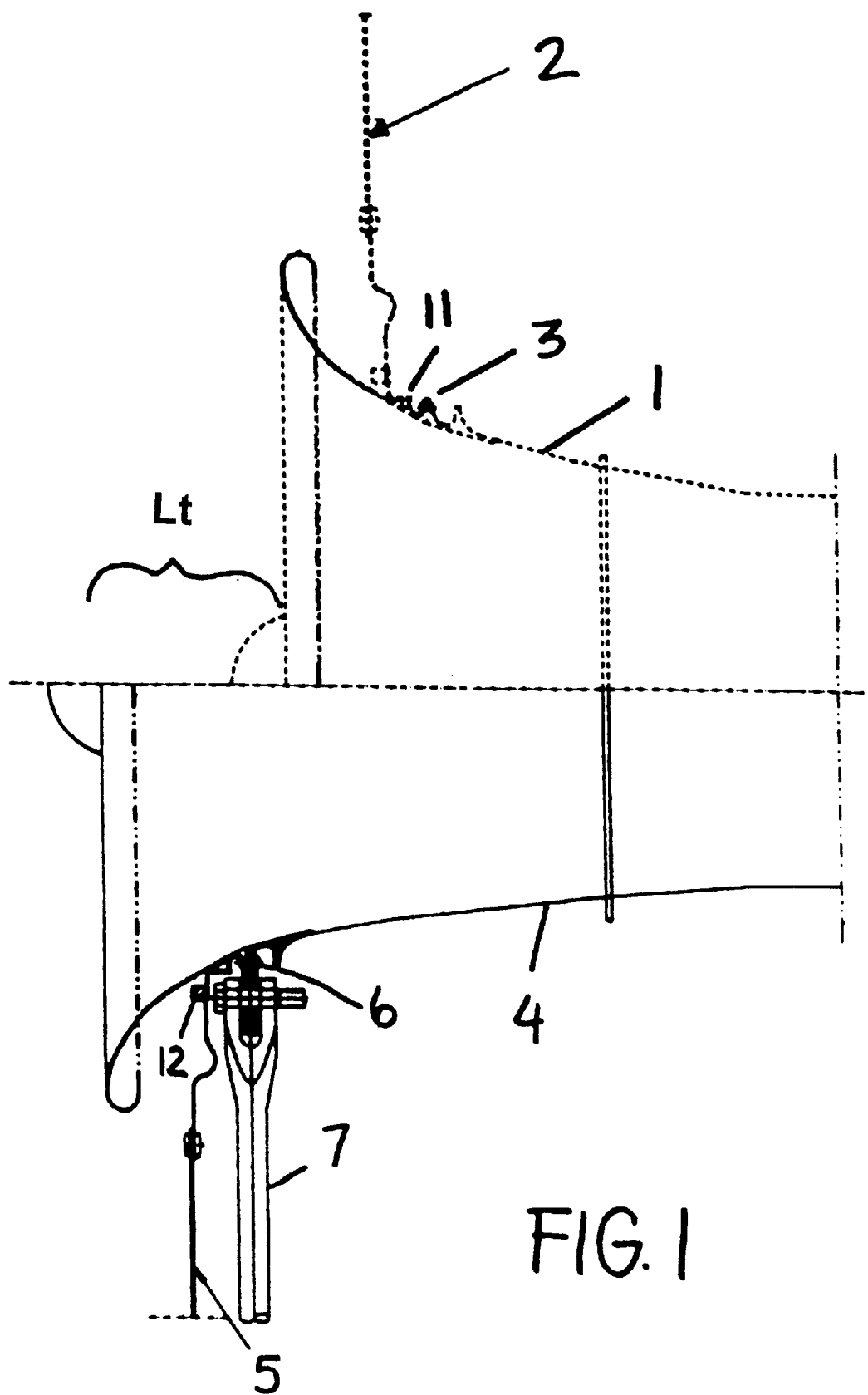
FIG. 1 shows, on top, a section of one end of the PE turbine and, at the bottom, one end of a Plus turbine, both having regular standard inlet bell mouths.

In the upper part of FIG. 1, there is depicted one end of a PE turbine A having an inlet bell mouth 1. A bell mouth door 2, extending substantially perpendicularly out from the inlet bell mouth 1, is connected to the bell mouth 1 at an anchorage point 11. One may also glimpse an anchorage point 3 for securing a support running from the bell mouth to the turbine frame R (see FIG. 5).

In the lower part of FIG. 1, one end of a Plus turbine B having an inlet bell mouth 4 is depicted. Here, as well, a bell mouth door 5 is connected to the bell mouth 4 at an anchorage point 12, and there is an anchorage point 6 for connection with a support 7 for the turbine connected to the bell mouth. Here it is seen that the increased length Lt of the Plus turbine B entails that the position of the bell mouth door 5 having the anchorage point 12 for the Plus turbine B is extensively displaced in relation to the position of the bell mouth door 2, having anchorage point 11 for the PE turbine A, and that the bell mouth door 2 would come into conflict with the anchorage point 6 for the support 7. Mounting the Plus turbine B on the frame R of the PE turbine A is thus impossible without extensive modification of the frame R since the placement of said anchorage point for the bell mouth door will not correspond with the new turbine.

Figure 2:
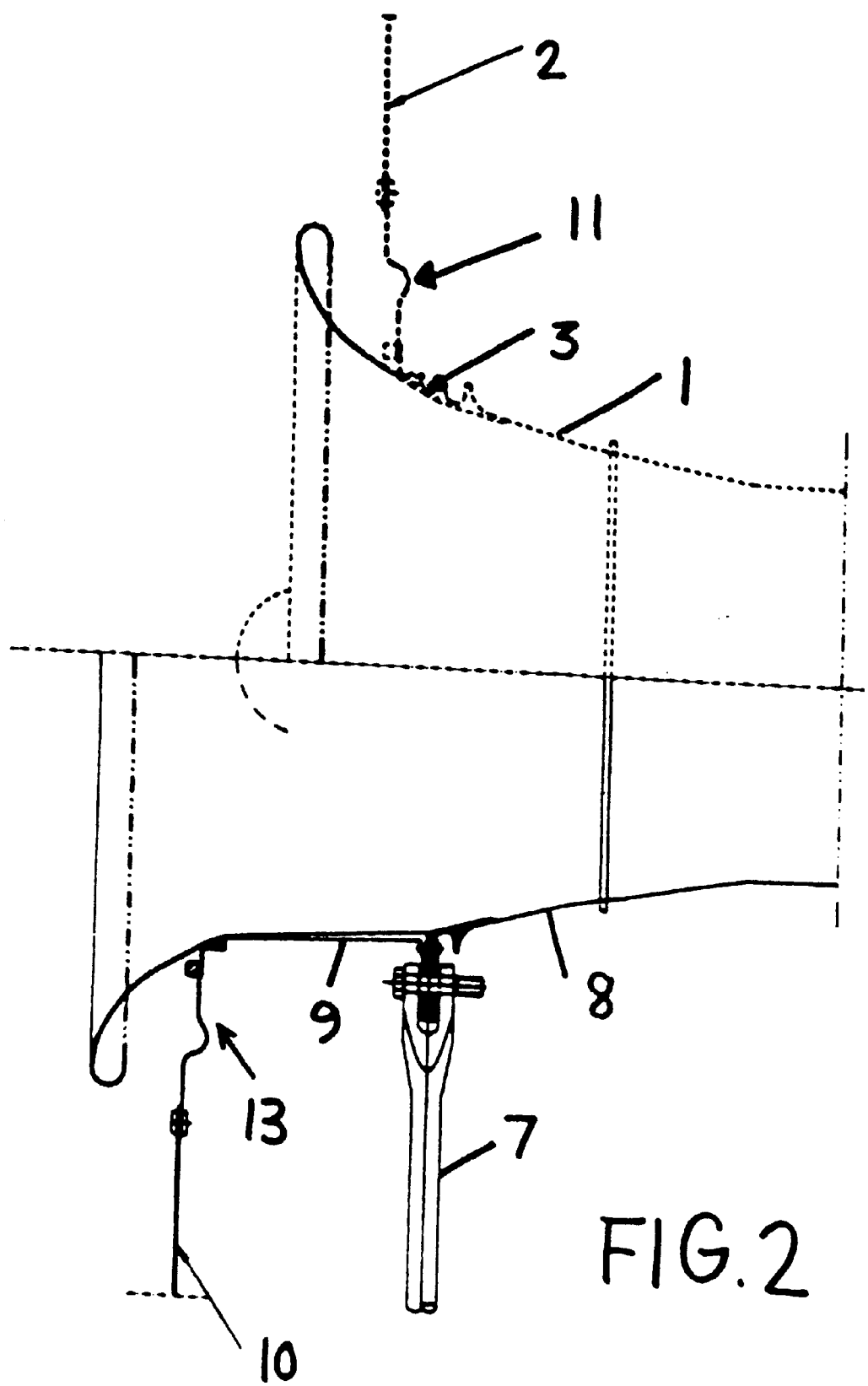
FIG. 2 shows, on top, the same end of the PE turbine having a regular inlet bell mouth, like in FIG. 1, and, at the bottom, the same end of the PE turbine having a modified bell mouth.

In FIG. 2, the upper part is identical to the upper part of FIG. 1 and shows one end of the PE turbine A, including an inlet bell mouth 1, a bell mouth door 2 having an anchorage point 11, and an anchorage point 3. The lower part shows however, a modified bell mouth for a PE turbine A, where the bell mouth 1 is extended with a distance piece 9 so that the bell mouth door 10 having an anchorage point 13 will be located at the same place as the bell mouth door 5 for the Plus turbine B. Thus, the new Plus turbine B may be mounted directly on the same frame as the PE turbine A without the bell mouth door and its position needing to be modified, this frame R having already been prepared to receive a Plus turbine B.

Figure 4:
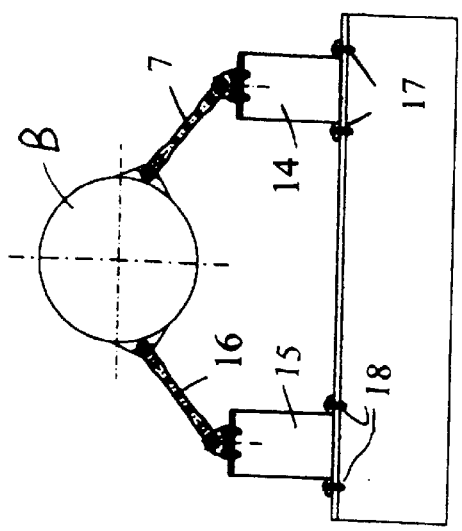
FIGS. 3 and 4 show a Plus turbine, seen from the side and from the end, respectively.
Figure 3:
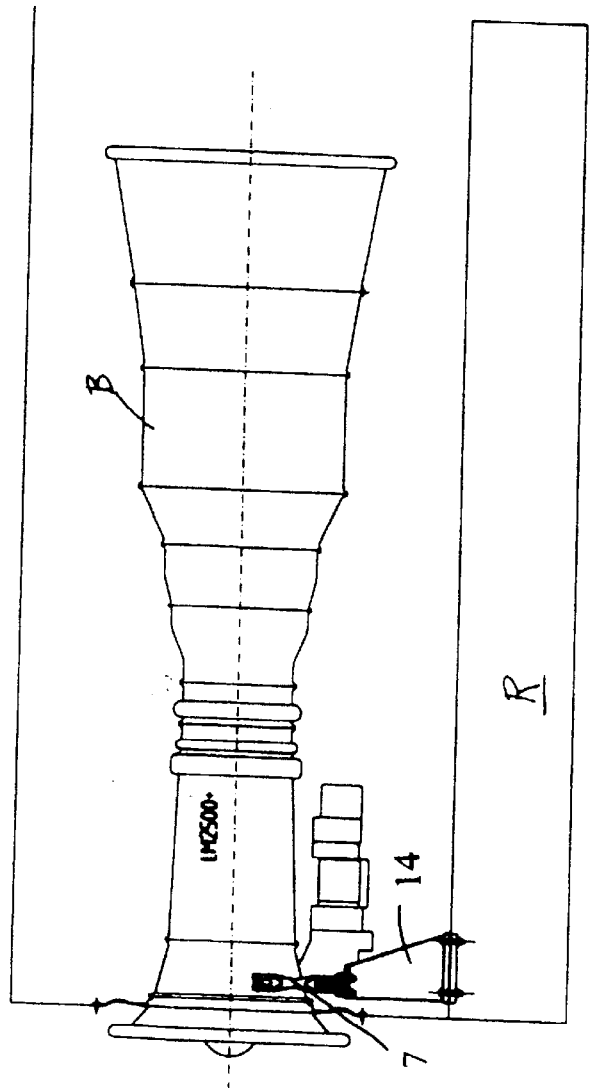

In FIG. 3 the Plus turbine B is shown in its entirety, viewed from the side. A support bracket 14 with pertaining stay 7 is also shown here. In FIG. 4 two support brackets 14 and 15 are shown with pertaining stays 7 and 16. The support brackets are secured to the frame R in anchorage points 17 and 18. The frame and the turbine are enclosed in a housing, a wall of which is formed by the bell mouth door 2.

Figure 6:
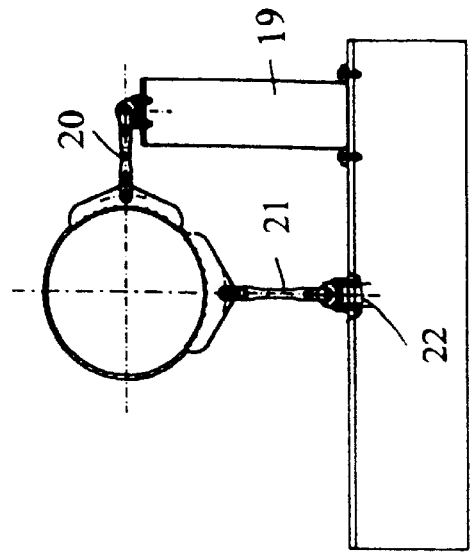
FIGS. 5 and 6 show a modified PE turbine seen from the side and from the end, respectively.
Figure 5:
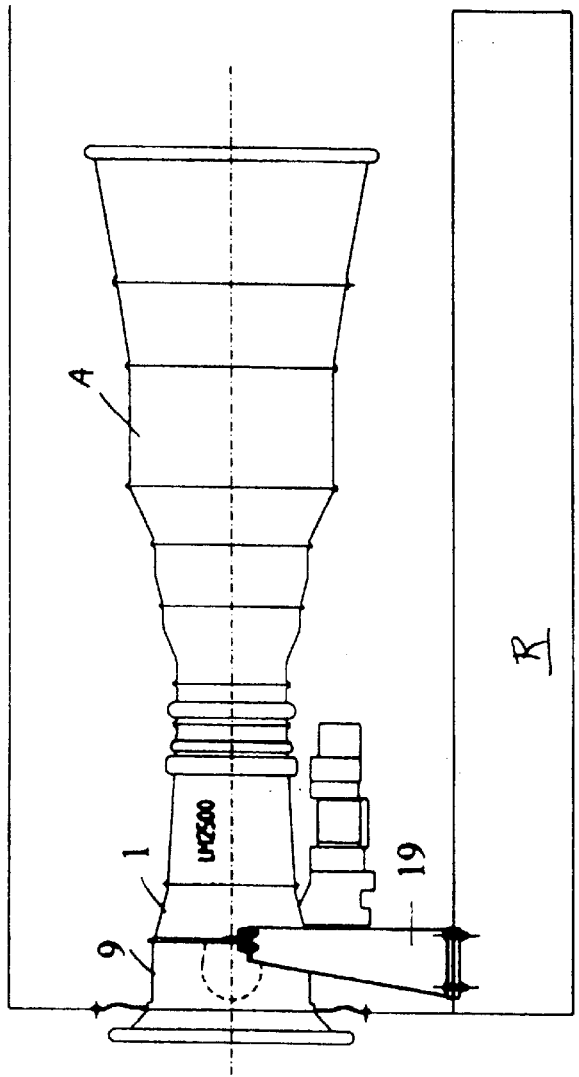

In FIGS. 5 and 6 the modified PE turbine A from FIG. 2 is shown schematically in its entirety, viewed, respectively, from the side and from the end. Thus, it is here seen that the extension of the bell mouth 1 by means of the distance piece 9 entails that turbine A becomes as long as turbine B in FIG. 3. A support bracket 19 and two stays 20 and 21, devised to secure turbine A to the frame R, are also shown. Here it is seen that the support bracket 19 is secured in the same anchorage point 17 on the frame R as the bracket 14 in FIGS. 3 and 4, whereas the stay 21 is fastened to an anchorage point 22.

Figure 8:
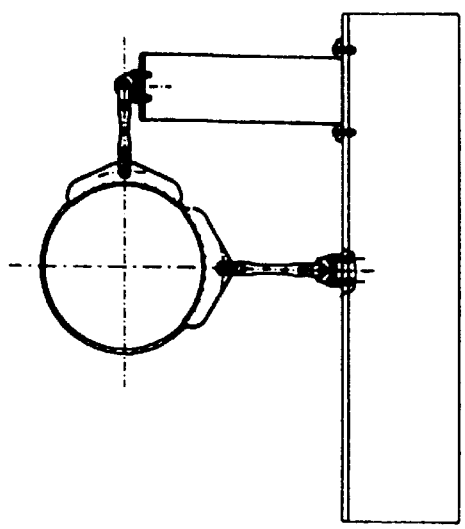
FIGS. 7 and 8 show another modified PE turbine seen from the side and from the end, respectively.
Figure 7:
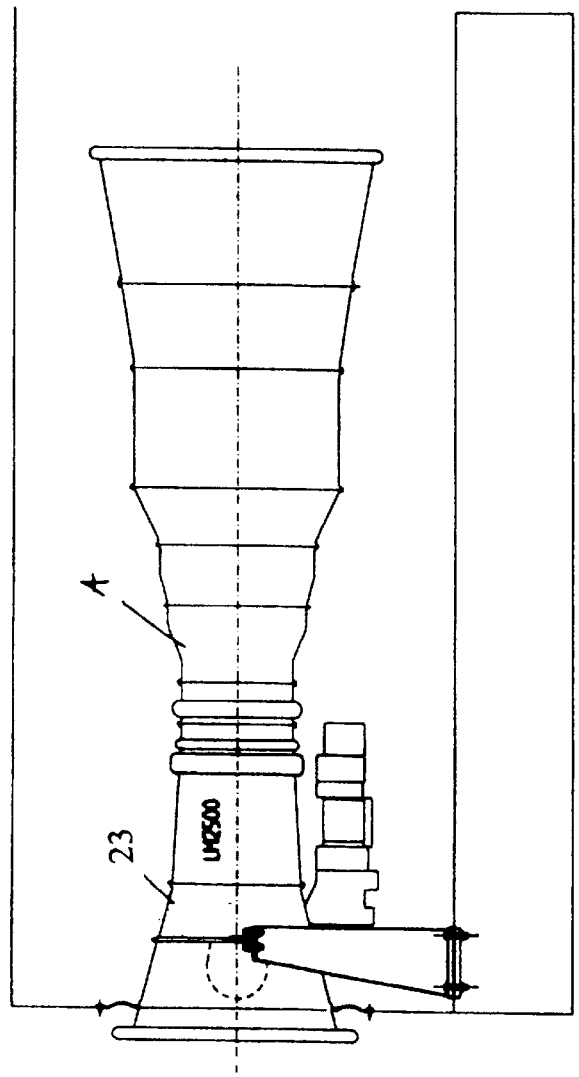

In FIGS. 7 and 8 a somewhat different version of a modified PE turbine A is shown. Instead of adding the distance piece 9, the bell mouth 1 is here exchanged with a completely novel and longer bell mouth 23. The bell mouth 23 exceeds the standard bell mouth length of the PE turbine A by a length Lt.

Figure 10:
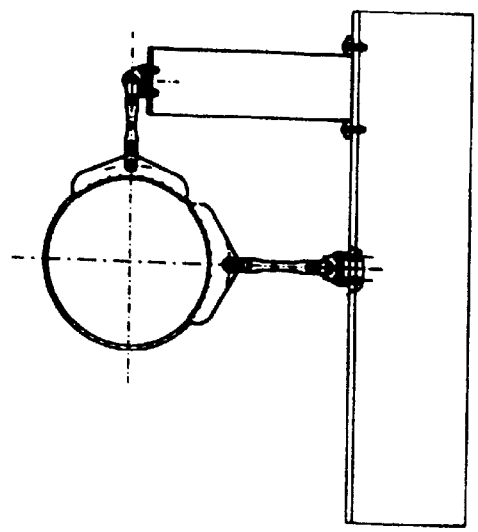
FIGS. 9 and 10 show a PE turbine seen from the side and the end, respectively, the bell mouth door having been modified whereas the turbine itself is standard.
Figure 9:
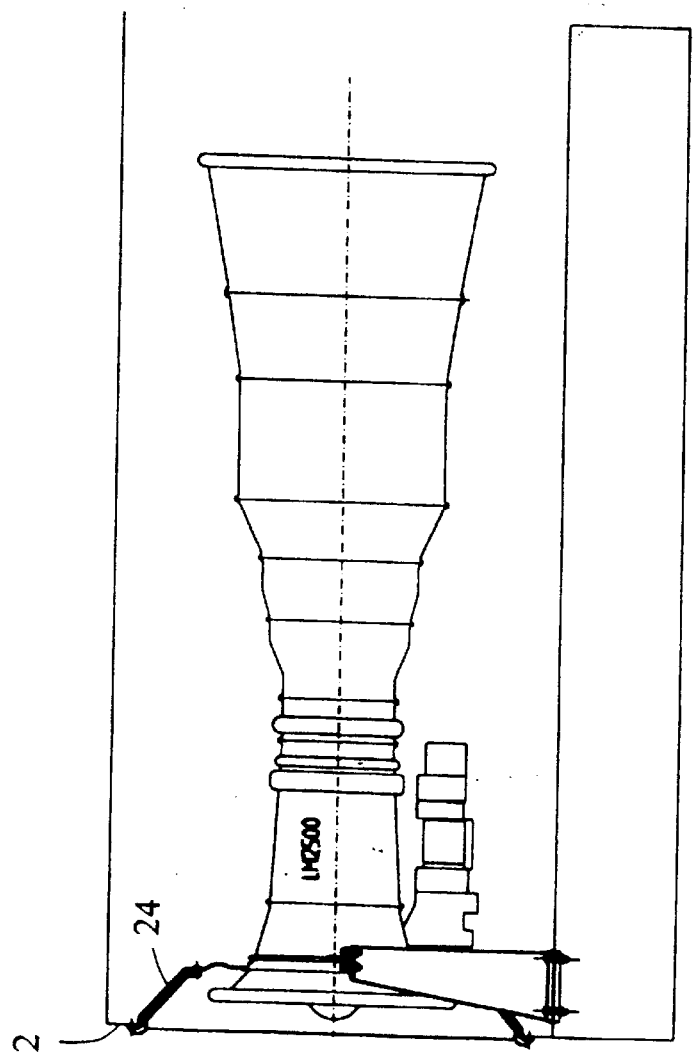

In FIGS. 9 and 10 there is shown another way of adapting a turbine package so that it may comprise PE turbine A and Plus turbine B, respectively. Instead of extending the bell mouth 1 of the PE turbine A, an adaptation has here been carried out of the bell mouth door 2 so that it has been provided with a conical section 24, extending from the plane of the bell mouth door to a plane that cuts through the anchorage points 11 for the bell mouth door on the bell mouth 1. When the Plus turbine B is to be mounted on the frame R the conical section 24 is removed and replaced by a standard bell mouth door.

Although the preceding description is based on specific turbine types, it is obvious that the art described above may also be used for any other combination of turbine types. Nor is there any limitation with respect to the invention in the number of steps the upgrading may contain. It will therefore be theoretically possible to use the described art also for upgrading procedures comprising 4 or 5 steps for exchanging the turbine with turbines of a longer type. Downgrading to turbines of a shorter type is also theoretically possible by means of the described art.

Moreover,-the invention is not limited to use in connection with longitudinal adaptation at the inlet end, but can also be used in an analogous manner by adaptation of the outlet end. For turbines using an inlet plenum and an outlet plenum instead of a housing having a bell mouth door, the longitudinal adaptation may be achieved in a manner exactly analogous to that described in the preceding pages. The plenum wall will then replace the bell mouth door.

What is claimed is:

1. A turbine package comprising:
   a first turbine motor comprising a first turbine section of a first length and a bell mouth at each end of said turbine section, one said bell mouth having a connection for receiving a frame end closing member;
   said frame end closing member; and
   a frame comprising anchorage points for supports for mounting on said frame a second turbine motor with a second turbine section of a second length longer than said first length and a bell mouth with a further connection for receiving said frame end closing member, said frame end closing member being positioned on said frame corresponding to the further connection of the second turbine motor,
   said one bell mouth having a length so that a length of said first turbine motor permits connection of said frame end closing member to said connection on said one bell mouth to close an end of said frame when said first turbine motor is mounted on said frame on supports at said anchorage points for the second turbine motor.

2. The turbine package of claim 1, wherein said one bell mouth comprises a separate annular extension member that increases the length of said first turbine motor.

3. The turbine package of claim 1, wherein said one bell mouth comprises a unitary bell mouth that increases the length of said first turbine motor.

4. A turbine package comprising:
   a first turbine motor comprising a first turbine section of a first length and a bell mouth at each end of said turbine section, one said bell mouth having a connection for receiving a frame end closing member;
   said frame end closing member; and
   a frame comprising anchorage points for supports for mounting on said frame a second turbine motor with a second turbine section of a second length longer than said first length and a bell mouth with a further connection for receiving said frame end closing member, said frame end closing member being positioned on said frame corresponding to the further connection of the second turbine motor,
   said frame end closing member comprising a frustoconical annular insert (24) that defines a concavity in said frame end closing member to permit connection of said frame end closing member to said connection of said one bell mouth to close an end of said frame when said first turbine motor is mounted on said frame on supports at said anchorage points for the second turbine motor.

5. A method of mounting a first turbine motor with a first turbine section of a first length in a frame that is adapted to receive a second turbine motor with a second turbine section of a second length longer than the first length, the first turbine motor having a first bell mouth at an end of the first turbine section that has a connection for receiving a frame end closing member that closes an end of the frame, the frame having anchorage points for supports for mounting on the frame the second turbine motor, the frame end closing member being positioned on the frame corresponding to a connection on a bell mouth at an end of the second turbine section, the method comprising the steps of:
   extending a length of the first bell mouth to increase a length of the first turbine motor;
   mounting the first turbine motor on the frame on supports at the anchorage points for the second turbine motor; and
   connecting the frame end closing member to the connection on the first bell mouth to close an end of the frame.

6. The method of claim 5, wherein the length of the first bell mouth is extended by inserting a separate annular extension member.

7. The method of claim 5, wherein the length of the one bell mouth is extended by providing a unitary bell mouth whose length extends the length of the first turbine motor.

8. A method of mounting a first turbine motor with a first turbine section of a first length in a frame that is adapted to receive a second turbine motor with a second turbine section of a second length longer than the first length, the first turbine motor having a first bell mouth at an end of the first turbine section that has a connection for receiving a frame end closing member that closes an end of the frame, the frame having anchorage points for supports for mounting on the frame the second turbine motor, the frame end closing member being positioned on the frame corresponding to a connection on a bell mouth at an end of the second turbine section, the method comprising the steps of:
   forming a concavity in the frame end closing member by inserting a frustoconical member into the frame end closing member;
   mounting the first turbine motor on the frame on supports at the anchorage points for the second turbine motor; and
   connecting the frame end closing member to the connection on the first bell mouth to close an end of the frame.

* * * * *